Oct. 27, 1959 R. J. TEITEL 2,910,417
URANIUM BISMUTHIDE DISPERSION IN MOLTEN METAL
Filed May 27, 1955 2 Sheets-Sheet 1

INVENTOR.
ROBERT J. TEITEL
BY

Oct. 27, 1959 R. J. TEITEL 2,910,417
URANIUM BISMUTHIDE DISPERSION IN MOLTEN METAL
Filed May 27, 1955 2 Sheets-Sheet 2
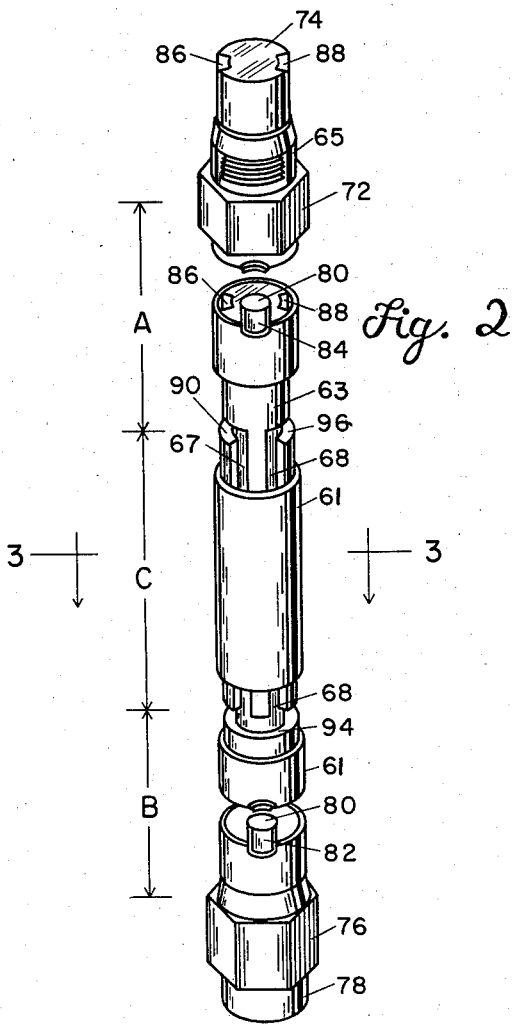
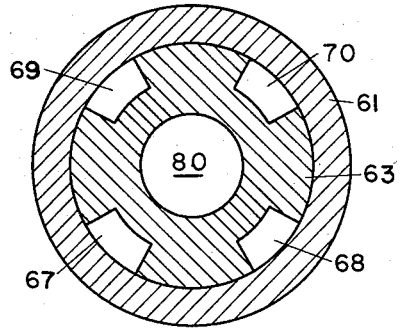
INVENTOR.
ROBERT J. TEITEL
BY
Roland A. Anderson
Attorney ём
United States Patent Office 2,910,417
Patented Oct. 27, 1959

2,910,417

URANIUM BISMUTHIDE DISPERSION IN MOLTEN METAL

Robert J. Teitel, East Patchogue, N.Y., assignor to the United States of America as represented by the United States Atomic Energy Commission Application May 27, 1955, Serial No. 511,809

11 Claims. (Cl. 204—193.2)

The present invention relates to liquid metal compositions containing dispersed solid intermetallic compounds of metals from which nuclear power may be derived.

In order to produce useful power from fissionable or fertile metals, such as uranium, thorium and plutonium, it is necessary to transfer heat produced from the fissioning of the fuels to an apparatus capable of converting heat into other forms of useful energy. To facilitate the rapid removal of heat as it is produced, provision of a good heat transfer medium in thermal contact with the fuels is highly desirable. It has been proposed to employ liquid metal media for this purpose because of their heat transfer properties. However, the choice of such metals is limited because of the unusual combination of properties required for use in connection with reactors. Only a few metals, including lead and bismuth, have the needed properties. However the amount of fissionable and fertile materials which can be dissolved in these metals is limited.

It is one of the objects of the present invention to provide compositions of fissionable materials in liquid metal media suitable for use in connection with nuclear reactors. Another object is to provide compositions of fertile metals in liquid metal useful as heat transfer media in removing heat produced in nuclear reactors. Another object of the invention is to provide liquid metal compositions containing fertile materials which can be used in connection with nuclear reactors to produce fissionable materials. Another object is to provide a number of intermetallic compounds which may be dispersed in liquid metal media. Still another object is to provide an apparatus in which the compositions of the subject invention may be employed to carry out nuclear reactions. A further object is to provide methods for removing the products of neutron irradiation from the compositions of the subject invention. Still a further object is to provide a method for the preparation of the compositions of the subject invention. Other objects will be in part apparent and in part pointed out hereinafter.

In one of its broader aspects, one of the objects of the present invention can be achieved by forming intermetallic bismuth compounds of thorium and uranium and dispersing them in liquid media containing bismuth and lead.

Solubility of uranium and thorium in liquid bismuth and solutions of lead and bismuth is limited to no more than a fraction of a percent at temperatures below 500° C. It has been discovered that it is possible to provide a composition having desirable flow and heat transfer properties by forming finely divided dispersions of intermetallic compounds of the metals in the liquid metal media. It has further been found that when concentrations of uranium and thorium are present in liquid bismuth, and lead-bismuth solutions in excess of the solubilities of these metals it is possible to form intermetallic compounds and that these compounds exist in equilibrium with the liquids in which they are dispersed. The compositions, containing the dispersed solids, may be flowed as liquids.

An apparatus particularly adapted to the use of the compositions of the subject invention and to similar compositions is shown in the attached drawing in which:

Figure 2 is an expanded perspective view with parts in section and parts removed illustrating a fuel element for use in the reactor of Figure 1.

Figure 3 is a section of Figure 2 taken along the line 3—3 of Figure 2.

Figure 1:
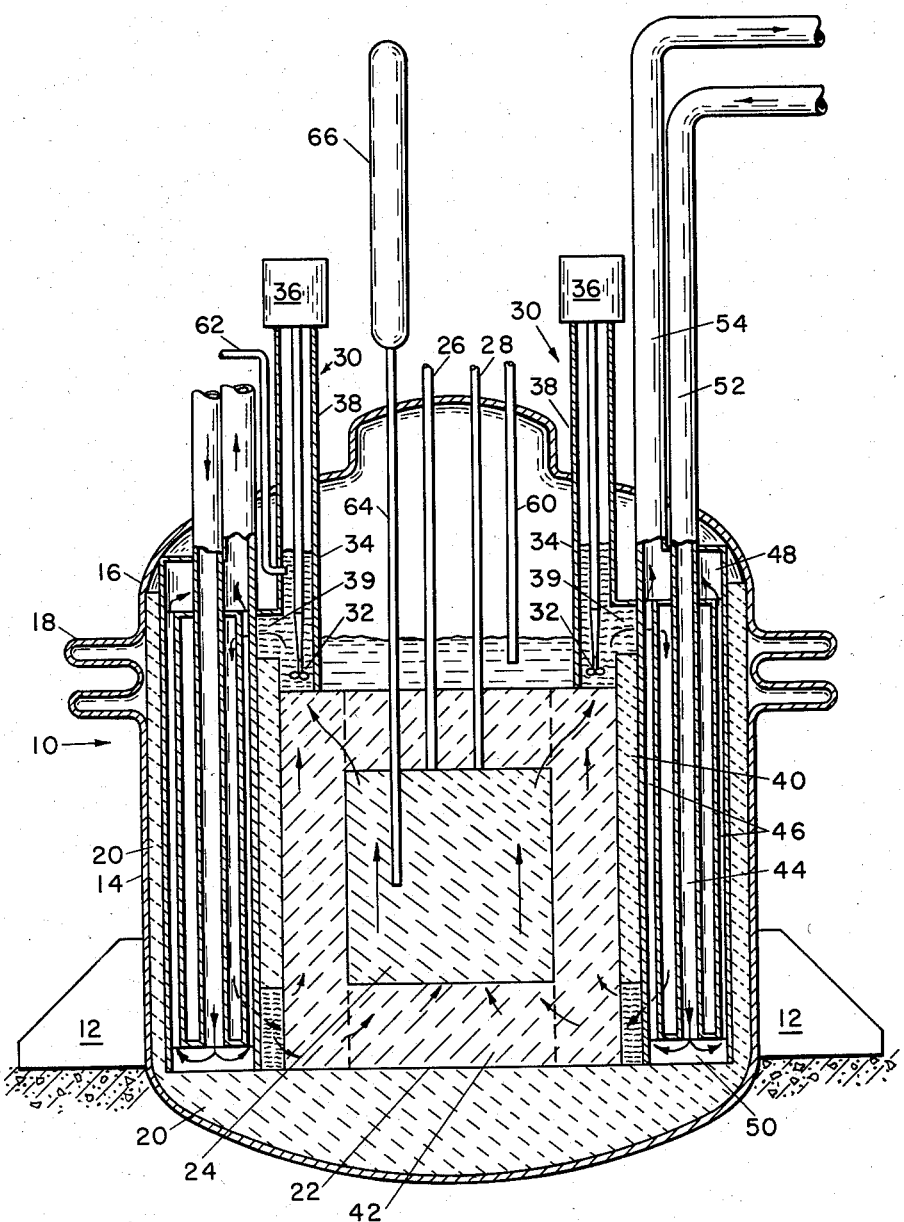
Figure 1 is a schematic illustration of a vertical section of a nuclear reactor and associated piping.

The intermetallic compounds UBi, a second bismuthide of uranium of lower uranium content and $TH_3Bi_5$ have been prepared. Their densities are 12.5, 12.4 and 10.5 respectively. The second uranium bismuthide compound exists in equilibrium with liquid bismuth and with compositions containing various proportions of lead and bismuth. One composition which is particularly valuable because of its low melting point is the dispersion of the second uranium bismuthide in the liquid medium containing about 55.5% bismuth and 44.5% lead by weight. The bismuth-lead solution must contain less than 80% lead in order to maintain the equilibrium with the second uranium bismuthide. The compound UBi is formed and exists in equilibrium with the liquid metal bismuth-lead solutions containing more than 80% lead.

The concentration of uranium in these compositions may be varied to provide a very fluid medium or a thick paste-like medium. Dispersions having suitable fluid properties for flowing through heat transfer or other liquid flow equipment normally encountered in a reactor at temperatuers of operation in the range of 400 to 600° C. may contain 10% uranium dispersed in the form of equiaxed particles having diameters of less than two millimeters. The compositions containing approximately 10% uranium are approximately 25% solid by weight.

The equiaxed dispersed solid settles from the liquid medium to form a composition containing approximately 60 to 70% solids. Such compositions are valuable for uses which do not require normal flow properties such as ease of movement through narrow flow passages.

For some purposes, dispersion of the uranium bismuth compounds in pure bismuth is preferred and for others, dispersions in liquids containing lead and bismuth is advantageous. The nuclear properties of lead are inferior to those of bismuth, lead having a neutron capture cross section of 0.18 barn and bismuth having a corresponding cross section of 0.03 barn. Where the cross section of the media are critical, dispersions in pure bismuth can be employed. However bismuth melts at approximately 273° C. whereas the lead bismuth eutectic containing about 44.5% lead and 55.5% bismuth melts at approximately 125° C. When a lower melting point is important, use of liquid dispersion media containing both lead and bismuth are preferred. Where other factors do not prohibit the use of lead, dilution of bismuth with lead is desirable because lead costs considerably less than bismuth.

The uranium content of the second uranium bismuthide is lower than the uranium content of UBi. Where uranium is desired in higher concentrations, as for example, where uranium 238 is to be exposed as a blanket to a neutron flux to produce plutonium, the use of liquid dispersion media containing lead in excess of 80% is preferred. UBi exists in equilibrium with a lead-bismuth liquid containing up to 95% lead.

Lead derived from most sources has inferior nuclear properties to those of bismuth. It is possible to partially overcome this disadvantage by the use of radiogenic lead. Radiogenic lead is that derived from mineral sources containing radioactive materials, such as uranium, and is formed by decay of these radioactive materials to lead. The lead 207 isotopic content of radiogenic lead is less than that of lead derived from other sources. It is because of this difference that the radiogenic material has superior nuclear properties. It is within the scope of the present invention to disperse bismuthides in liquid dispersion media containing radiogenic lead.

The particle size and shape of the dispersed solid have an important bearing on the use to which the compositions are and can be put. If the composition is to flow through a flow system, the particles should preferably be small and in substantially equiaxed form; that is, they should have approximately the same size along their three particle axes.

UBi may be formed into a finely divided equiaxed dispersion by heating uranium, bismuth and lead in the required proportions to approximately 1200° C. for about an hour and allowing the material to cool. As noted above, the bismuth-lead bath must contain more than 80% and less than 95% by weight of lead to form the UBi compound.

The second uranium bismuthide compound precipitates from lead-bismuth melts containing bismuth and less than 80% lead in the form of platelets. Such platelets are desirable where the composition is to be employed in a static form because of the relatively low settled bulk density of the platelets in the liquid medium. A settled composition containing as low as 2% uranium can be prepared in this manner.

When it is desired to flow the dispersed second uranium bismuthide compound in liquid bismuth or lead bismuth compositions, it is preferred that the compound be present in finely divided equiaxed form. Finely divided dispersions in form suitable for flowing as a liquid can be prepared by immersing finely divided uranium into the liquid bismuth or lead bismuth medium at the temperature of use, e.g. 400 to 600° C. The particles of UBi have approximately the same size as the uranium particles from which they are formed. The uranium has a selective affinity for bismuth and it is thus possible to prepare the bismuthide by uranium additions to a liquid containing both lead and bismuth. The finely divided uranium useful for this purpose can be prepared by a number of procedures. One such procedure involves heating the uranium in an atmosphere of hydrogen at a lower temperature, to form uranium hydride and subsequently heating this hydride in vacuo to higher temperatures to decompose the hydride into finely divided uranium powder. A lower temperature of 250° C. and a higher temperature of 350° C. can be used for this purpose. If it is desired to prepare an extremely finely divided dispersion of uranium bismuthide, the hydride may be immersed directly into a liquid medium. In this manner dispersions are formed, the particles of which are of submicroscopic size.

The thorium bismuthides are particularly useful as blanket materials; that is, compositions to be placed in a region into which neutrons pass from some source such as the core of a nuclear reactor, a poloniumberyllium source, or others. According to the method of the subject invention thorium bismuthide dispersions in bismuth and bismuth-lead compositions are provided having substantial similarities to the second uranium bismuthide. The crystallographic form of $Th_3Bi_5$ is similar to the second uranium bismuthide; that is, it precipitates from solution in platelet form and can advantageously be used in this form as a static blanket material having a relatively high percentage of thorium.

The thorium bismuthide may also be prepared in finely divided equiaxed form by immersing finely divided powder directly into the lead-bismuth compositions. Such preparation may be advantageously employed where it is desired to form a thorium containing composition which can be flowed through heat transfer or other flow apparatus.

After the dispersed materials have been exposed to neutron irradiation for a given length of time, radiation products are formed and deposited not only in the liquid portion of the composition but in the solid as well. Methods for the removal of certain radiation products from liquid metals are described in the copending application of D. W. Bareis, S.N. 350,910, filed April 24, 1953, now Patent Number 2,758,023. It is desirable to provide a method for removal of the radiation products from the dispersed solid to the liquid dispersion medium. Such removal can be accomplished by completely liquefying the composition at a high temperature and reconstituting the dispersion by precipitating the solid. This procedure has been found to result in the displacement of a substantial fraction of the products of neutron irradiation from the solid to the liquid. This procedure is particularly beneficial for the removal of radiation products from dispersions of UBi which are being employed as a flowing liquid medium because the solid forms from the melt in the equiaxed form. By repeating this process a number of times and separating and purifying the liquid before each repetition substantially all of the transferred radiation products can be removed from the solid.

A second procedure for removing the radiation products from the solids has particular utility for the second uranium bismuthide and the $Th_3Bi_5$ solids and involves partially melting them followed by subsequent cooling. The procedure is preferably preceded by a dilution of the compositions with an excess of the liquid. This dilution step is particularly valuable when treating relatively concentrated dispersions, e.g., containing in the order of 25% solids by weight, in that it makes it possible to treat the dispersion at lower temperatures than would be possible without it. Dilution also allows an easier separation between the liquid bearing radiation products, and the solid of the dispersion. The diluted dispersion is heated for a short time at a temperature which results in a given fraction of the dispersed solids and associated radiation products going into solution. The dispersion is then cooled and put through a low temperature phase separator, as for example, a centrifugal separator or filtration apparatus to remove about as much liquid as was added in the dilution step. A temperature above the melting point of the liquid in the range of 350° C. is suitable for the low temperature phase separation. A small amount of thorium or uranium may be added to replace that converted to irradiation products and that removed in the separated liquid. The partial solution of the solid can be easily accomplished because at each temperature the solid has a definite solubility in the liquid medium and a processing temperature can thus be chosen below that at which all the material would dissolve. Heating to a temperature sufficient to dissolve all of the dispensed solid must be avoided in carrying out this process.

At temperatures normal for the operation of a liquid metal fuel reactor, for example 400 to 600° C., the solubility of the solid is relatively low. As the temperature of the composition is raised, the solubility increases but does not equal the concentration of the dispersed metal in the liquid. It is thus possible to take advantage of the limited solubility of the metal in the liquid medium to partially dissolve the dispersed solid. The dilution not only makes the dispersions more fluid but provides more liquid and thus permits solution of a larger percentage of a given quantity of thorium or uranium metal at lower temperature. The phase separation is carried out at a low temperature after the dispersion has been reconstituted, because the thorium or uranium has lower solubility at this temperature and the quantity thereof in solution is lowered before removal of the added portion of the solvent. This method has advantage in removing the radiation products from particles which normally precipitate from solution in platelet form because they do not precipitate in such form when processed according to this procedure. The precipitation occurs rather on the surface of the particle cores which remain dispersed even at the highest temperature to which the dispersion is heated in carrying out this process. These particle cores, which remain dispersed at the higher temperature, are formed by partial solution of equiaxed particles, and the precipitation of the metal from solution has been found to result in the reformation of the desired equiaxed particles.

The compositions disclosed herein have particular utility in connection with nuclear reactors. One reactor which makes possible the realization of the advantages inherent in these compositions is illustrated in the attached Figure 1. This reactor employs a uranium dispersion in its core and a thorium dispersion in the blanket.

Referring to the figure, the reactor components are contained within an outer steel vessel 10 supported at its base by the support lugs 12. The vessel has the general shape of a pot with a lower container portion 14 and an upper lid portion 16. The two portions are joined at an annular thermal expansion joint 18 which has the form of a number of folds of a bellows.

The inner surface of the container portion is preferably lined with a layer of graphite 20 at least to the height of the level of liquid metal in the continer. The upper surface of a graphite liner in the bottom of the container forms a platform 22. The platform supports a graphite assembly 42 which may have the form of a right cylindrical block. The block contains two sets of flow channels, a first set for the flow of liquid metal fuel through a core region and a second for the flow of primary coolant or blanket material. The major active flow volume is located at the geometric center 24 or core of the block 42 indicated on the figure by reverse hatching to that on the remainder of block 42. The second set of channels extends throughout the block 42 so that the liquid blanket material may be flowed both through the core and through the portion of the block surrounding the core.

The supply of liquid fuel to the core channels may be made through a conduit 26 which connects an inlet manifold integral with the core channels to a supply of fuel dispersion external to the container 10. The removal of the liquid fuel may be made through a second conduit 28 which connects a core outlet manifold to the vessel exterior through the lid 16 to a receiving vessel. Although the fuel can be flowed into and out of the core through the conduits 26 and 28, rapid circulation is not essential and the fuel may remain static or may be slowly circulated. Conventional manifolding, supply, and receiving means may be employed and are not shown.

The second set of flow channels forms a blanket volume extending substantially throughout the block 42 and permits the flow of liquid metal blanket material therethrough. This second liquid metal plays two important roles in this reactor. The first role is as a heat transfer medium which removes heat generated in the fuel from the core. The second role is as a conveyant of fertile material. Dispersions of thorium bismuthide in liquid bismuth or lead-bismuth media as disclosed above may be used for these purposes.

Although the two sets of flow passages are sealed from each other, there is sufficient contiguity in the core region to permit heat transfer from the fuel to the coolant blanket flowing through the second set of channels. The graphite block 42 may thus be seen to serve a triple function. It separates the fuel and coolant streams, it transfers heat from the fuel to the coolant and it slows down neutrons to thermal energies.

The movement of the coolant blanket through and from the block 42 is caused by a number of pumps 30. The blades 32 of the pumps are fixed at the lower ends of extended shafts 34, the upper ends of the shafts being mechanically joined to the pump motors 36. The shaft housings 38 and the casing of the motor 36 are joined to form a seal which prevents the access of air to the liquid being pumped. The housing 38 is also sealed through the lid 16 to prevent air from contacting the metal. The lower extension of housing 38 may contact the upper surface of block 42. The ports 39 in the housing wall above the blades 32 permit liquid metal coolant to pass from the housing into contact with heat exchange units 44. A weir 40, preferably composed of solid graphite and having an annular configuration, partially surrounds the cylindrical block 42. This weir prevents the direct flow of coolant blanket from the sides of the block 42 to the heat exchanger 44. The blanket liquid must pass rather from the upper portion of the block through the ports 39 to the upper end of the heat exchangers 44. After flowing downwardly in contact with the exchangers the blanket liquid passes under weir 40 to re-enter the block at the bottom thereof.

The heat exchangers 44 are disposed in the outer region of the container between the weir 40 and the graphite liner 20. Approximately eight such exchangers spaced at equal intervals around the periphery of the container and separated from each other by solid graphite spacers are employed in removing heat from the liquid metal blanket. One pump 30 supplies blanket coolant flow to each heat exchanger.

The exchangers are made up of a number of tubes 46 which are manifolded to an upper liquid collecting manifold 48 and a lower liquid distributing manifold 50. A secondary coolant liquid is supplied to the lower manifold through a conduit 52 sealed through the lid 16 of the container and extending the full length of the exchanger. A conduit 54 provides a flow path for removal of the secondary coolant rising through the heat exchanger tubes 46.

The liquid metal blanket material may be introduced and removed from the container 10 through the conduits 60 and 62 respectively. Means for changing the level of the neutron flux in the core 24 are provided in the form of a rod 64 extending from a raising and lowering mechanism housed in an external container 66. The lower end of the rod may contain a neutron absorbing substance such as cadmium or a neutron generating substance such as radium beryllium depending on the use to be made thereof. Insertion or retraction of the rod 64 into the reactor core provides a control over the level of the neutron flux therein. A plurality of such rods may, of course be employed.

Whereas the core flow passages and blanket flow passages may be formed in the block 42 in a great variety of configurations, one configuration which provides desirably high thermal contact between liquid fuel and liquid blanket is illustrated in the attached Figures 2 and 3. As noted above, Figure 2 is a schematic exploded perspective view, with portions sectioned and removed, of the element shown in radial section in Figure 3. A number of these tubes can be assembled into the central vertical portion of the block 42 (indicated in Figure 1 by the vertical dotted lines extending from the edges of core 24) to provide the flow paths for the supply and removal of liquid fuel and blanket coolant from the core and blanket regions above and below the core.

Each tube may have a length of approximately 14 feet. The element is formed from a continuous tubular outer sleeve 60 and a grooved inner spacer 62. Figure 3 illustrates the relation of these two components in the core portion of the element. The element is divided into three portions, the upper blanket portion A, the lower blanket portion B and the central core portion C extending therebetween. Above the upper manifold blanket portion is a spacer 72 having a hexagonal shape and formed integrally with tube 61 on the outer surface thereof. At the lower end of the element, a hexagonal spacer 76 is formed integrally on the outer surface of the tube 61. The lower end of the element terminates in a solid end cap 78 on which the element rests on the platform 22 of the reactor. The assembly of the elements is made by standing a number of these elements on the platform with the upper and lower hexagonal spacers meshed with spacers of other elements. While the meshed spacers form platforms at the upper and lower central region of the block 42, the main lengths of the tubes are exposed to the coolant blanket.

This blanket may thus pass into contact with the external surface of the tube 61 to remove heat therefrom. The blanket may also pass through an axial flow passage 80 in the center of each element. Access to this flow passage is provided through the tubular entrance port 82 at the lower portion of the element, and the heated coolant rising through the tube may exit to the tubular exit port 84 at the upper blanket portion A of the tube.

The largest volume of liquid metal fuel is in the core portion C of the element. Four longitudinal grooves 69, 67, 68 and 70 in the rod 62 provide the main core volume for containing liquid metal fuel. The fuel is retained in these grooves by the tubular element 61 which closely conforms to the outer surfaces of the rod 63. The two left hand grooves 69 and 67 shown in Figure 3 form the downward flow passage for the liquid metal through the core region and the two right hand grooves 68 and 70 form the upper flow path for this liquid through the core region. Flow of the liquid fuel to the core is provided through the groove 86 which extends from the top of the rod to the groove 90 and joins grooves 69 and 67 at their upper ends. The liquid metal passes from the grooves 69 and 67 to the grooves 68 and 70 through an annular groove 94 at the lower ends of the fuel grooves. Fuel may be removed from the core region through the longitudinal groove 88 extending from the tube of the rod 63 to the upper portion of the grooves 68 and 70 where they are joined by the semicircular groove 96.

When a block 42 is made up of an assembly of tubes, such as that illustrated in Figures 2 and 3, the outer portion of the block may be formed from graphite tubes or blocks or substantially any form which provides upward flow passages. It may be desirable to provide some restriction on the flow of liquid through the outer portion of the block in order to produce greater flow through the core.

It will be noted from Figure 1 that all the graphite components rest in the container on the bottom thereof and that substantially all the metal components are sealed through and suspended from the lid portion 16 thereof. This construction is advantageous in that it minimizes the number of metal to graphite seals which are required. This arrangement is advantageous in addition because it permits all of the metal components to be removed from the reactor and replaced simply by making appropriate cuts in the lid 16 to permit removal and by welding the replacement to the lid. Another feature of the apparatus is that all of the valuable primary radioactive materials including the fuel, the coolant blanket may be withdrawn from the tank, should the tank itself be damaged and no longer usable.

Since many embodiments might be made in the present invention and since many changes might be made in the embodiment described, it is to be understood that the foregoing description is to be interpreted as illustrative only and not in a limiting sense.

I claim:

1. As a composition of matter a bismuthide of uranium in a liquid metal composition containing less than 80% lead and the remainder bismuth, said bismuthide being present in the form of platelets at the normal settled density thereof and in equilibrium with the liquid.

2. The method of preparing a uranium bismuthide having a low settled density in a liquid metal medium which comprises dissolving uranium in a composition of lead and bismuth containing less than 80% lead, and lowering the temperature of the composition to a temperature below the point at which the solubility of uranium is exceeded and above the melting point of the composition.

3. The method of forming bismuthide of uranium in which the atomic percent of uranium and bismuth are about equal which comprises heating uranium in a composition of lead and bismuth containing 80% to 95% lead to about 1200° C. to completely dissolve the uranium and allowing the composition to cool to a temperature above the melting point of the lead-bismuth composition.

4. The method of forming a dispersion of finely divided equiaxed particles of uranium bismuthide in a liquid of lead and bismuth containing less than 80% lead which comprises forming particles of uranium metal of the same approximate size as the particle size of bismuthide to be formed, and immerging them in the liquid metal in a concentration exceeding the uranium solubility in the liquid.

5. The method of forming a dispersion of submicroscopic particles of uranium bismuthide in a liquid composition of lead and bismuth containing less than 95% lead which comprises forming uranium hydride and immerging said hydride in said liquid in a quantity exceeding the solubility of uranium therein.

6. The method of removing radiation products from a relatively concentrated dispersion of a bismuthide of a metal selected from the group consisting of uranium and thorium in a liquid lead-bismuth composition which comprises adding a quantity of the composition to the dispersion, heating to partially melt the bismuthide, cooling, and removing a quantity of liquid composition approximately equal to that added.

7. As a composition of matter a finely divided bismuthide of uranium dispersed in and in equilibrium with a liquid metal medium containing less than 95% lead and the remainder bismuth.

8. As a composition of matter a finely divided bismuthide of uranium in platelet form dispersed in and in equilibrium with a liquid metal medium containing less than 80% radiogenic lead and the remainder bismuth.

9. As a composition of matter a finely divided bismuthide of uranium dispersed in and in equilibrium with a liquid metal medium containing 55.5% bismuth and 44.5% radiogenic lead.

10. As a composition of matter a finely divided bismuthide of uranium in equiaxed form dispersed in and in equilibrium with a liquid metal composition containing 80 to 95% lead and the remander bismuth.

11. The composition of claim 10 wherein the lead is in radiogenic form.

References Cited in the file of this patent

UNITED STATES PATENTS 2,758,023    Bareis  _____ Aug. 7, 1956

OTHER REFERENCES

Brewer et al.; U.S. AEC Document, AECD–2730, declassified Nov. 2, 1949, 7 pages.

Williams et al.: "Nuclear Engineering," Part I, American Institute of Chemical Engineers, Progress Symposium Series No. 11, vol. 50 (1954), pp. 245–252.

Teitel et al.: "Liquid Metal Fuels and Breeder Blankets," Nucleonics, July 1945, pages 14, 15.

Nuclear Science Abstracts, vol. 10 (1956); Abstract No. 5369 (abstract of BNL–1782, Mar. 10, 1954), Abstract No. 4304 (abstract of ISC-48, July 12, 1950).